US009398613B2

(12) United States Patent
Kang et al.

(10) Patent No.: US 9,398,613 B2
(45) Date of Patent: *Jul. 19, 2016

(54) APPARATUS AND METHOD FOR SUPPORTING TIME-CONTROLLED SERVICE IN MACHINE-TO-MACHINE COMMUNICATION SYSTEM (71) Applicant: Samsung Electronics Co., Ltd., Gyeonggi-do (KR)

(72) Inventors: Hyun-Jeong Kang, Seoul (KR); Rakesh Taori, Gyeonggi-do (KR); Yeong-Moon Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,854

(22) Filed: Oct. 2, 2015

(65) Prior Publication Data

US 2016/0029410 A1 Jan. 28, 2016

Related U.S. Application Data (63) Continuation of application No. 14/594,666, filed on Jan. 12, 2015, now Pat. No. 9,173,051, which is a continuation of application No. 13/346,232, filed on Jan. 9, 2012, now Pat. No. 8,934,933.

(30) Foreign Application Priority Data

Jan. 7, 2011 (KR) .................. 10-2011-0001705
Jan. 4, 2012 (KR) .................. 10-2012-0000951

(51) Int. Cl.
H04W 74/04 (2009.01)
H04W 4/00 (2009.01)
H04W 76/02 (2009.01)

(Continued)

(52) U.S. Cl.
CPC ............ *H04W 74/04* (2013.01); *H04W 4/005* (2013.01); *H04W 48/02* (2013.01); *H04W 76/02* (2013.01); *H04W 76/048* (2013.01); *H04W 60/00* (2013.01); *H04W 74/002* (2013.01); *H04W 92/18* (2013.01)

(58) Field of Classification Search
CPC ..... H04W 12/08; H04W 4/02; H04W 4/0005; H04W 4/021; H04W 60/00; H04W 76/02; H04W 88/02; H04W 48/16; H04W 24/04; H04W 48/08; H04W 4/08; H04W 8/04; H04W 8/06; H04W 76/068; H04W 2207/18; H04W 72/042; H04W 72/0406; H04W 72/02; H04W 72/04; H04W 72/0426; H04W 72/1278; H04W 12/02; H04W 24/08; H04W 40/24; H04L 60/91; G06Q 30/0267; H04H 20/71

See application file for complete search history.

(56) References Cited

U.S. PATENT DOCUMENTS

2009/0217348 A1    8/2009   Salmela et al.
2010/0057485 A1    3/2010   Luft
2010/0146117 A1    6/2010   Hoeksel
2010/0177663 A1    7/2010   Johansson et al.

(Continued)

Primary Examiner — Sujatha Sharma
(74) Attorney, Agent, or Firm — The Farrell Law Firm, P.C.

(57) ABSTRACT

Methods and apparatuses are provided for operating a Mobile Station (MS). A service flow is established with a Base Station (BS). Data is transmitted through the service flow to the BS at an access admission time. A first group control signal indicating a data communication interruption for the service flow is received from the BS at an access restriction time. Transmission of the data to the BS is ceased together with the ceasing of a data transmission from another MS of a group according to the first group control signal.

20 Claims, 9 Drawing Sheets (51) Int. Cl.
*H04W 76/04* (2009.01)
*H04W 48/02* (2009.01)
*H04W 60/00* (2009.01)
*H04W 74/00* (2009.01)
*H04W 92/18* (2009.01)

(56) References Cited

U.S. PATENT DOCUMENTS

| | | | |
|---|---|---|---|
| 2012/0004003 | A1 | 1/2012 | Shaheen et al. |
| 2014/0105009 | A1 | 4/2014 | Vos et al. |
| 2014/0226470 | A1 | 8/2014 | Kim |
| 2014/0226641 | A1 | 8/2014 | Kim |

APPARATUS AND METHOD FOR SUPPORTING TIME-CONTROLLED SERVICE IN MACHINE-TO-MACHINE COMMUNICATION SYSTEM

PRIORITY

This present application is a Continuation Application of U.S. application Ser. No. 14/594,666, filed in the U.S. Patent and Trademark Office (USPTO) on Jan. 12, 2015, which is a Continuation Application of U.S. application Ser. No. 13/346,232, filed in the USPTO on Jan. 9, 2012, now U.S. Pat. No. 8,934,933, issued on Jan. 13, 2015, which claims priority under 35 U.S.C. §119(a) to patent applications filed in the Korean Intellectual Property Office on Jan. 7, 2011 and Jan. 4, 2012 and assigned Serial Nos. 10-2011-0001705 and 10-2012-0000951, respectively, the entire disclosures of which are incorporated herein by reference.

BACKGROUND OF THE INVENTION

1. Field of the Invention

The present invention relates generally to a Machine-To-Machine (M2M) communication system, and more particularly, to an apparatus and method for supporting an application providing a service only for a predetermined period of time in an M2M communication system.

2. Description of the Related Art

Research is currently being conducted on a Machine-To-Machine (M2M) communication service that supports machine-to-machine data communication in a case in which there is little or no direct human interaction. The M2M communication service decreases the cost of device management by automation and communication. Specifically, the M2M communication service is a technology applicable to health care, home automation, smart metering, and fleet management of vehicles and articles mounted on the vehicles.

In the M2M communication system, a system designer may be required to consider a device that transmits/receives data for a limited period of time unlike a Subscriber Station (SS) of a general communication system. For example, a smart metering device may transmit metered values to a smart meter server at fixed periods, for example, once a month, or may receive metering information from the smart meter server once a day. As another example, a healthcare device may receive up-to-date healthcare information from a healthcare server once a day.

As described above, the M2M communication system may transmit or receive data for a predetermined period of time depending on the purpose and use of a subscriber station. That is, because data related to a service subscribed by the subscriber station should be accessed only for a predetermined period of time, the subscriber station may be registered in the network only for the predetermined period of time or may use the network resources only for the predetermined period of time. In order to allow an access only for the predetermined period of time, a network registration/deregistration process and a Dynamic Service Addition (DSA)/Dynamic Service Deletion (DSD) process is frequently performed for the predetermined period of time. What is thus required is a scheme for performing efficient communication to overcome the above problem.

SUMMARY OF THE INVENTION

Accordingly, the present invention has been made to solve at least the above-described problems and/or disadvantages and to provide at least the advantages described below. Accordingly, an aspect of the present invention is to provide an apparatus and method for efficiently providing a service capable of accessing data only for a predetermined period of time in an M2M communication system.

According to an aspect of the present invention, a method is provided for operating a Mobile Station (MS). A service flow is established with a Base Station (BS). Data is transmitted through the service flow to the BS at an access admission time. A first group control signal indicating a data communication interruption for the service flow is received from the BS at an access restriction time. Transmission of the data to the BS is ceased together with the ceasing of a data transmission from another MS of a group according to the first group control signal.

According to another aspect of the present invention, a method is provided for operating a BS. Service flows are established with a plurality of MSs subscribed to a time-controlled service. A command signal including at least one of access interruption indication information and access resumption time information with respect to the established service flows of the plurality of MSs, is received from a server. A first group control signal indicating a data communication interruption for the service flows of the plurality of MSs according to the access interruption indication information, is transmitted.

According to another aspect of the present invention, a method is provided for operating a server. Access control with respect to a time-controlled service is determined for a plurality of MSs. A command signal including at least one of access interruption indication information and access resumption time information with respect to established service flows of the plurality of MSs based on the access control, is transmitted to a BS.

According to another aspect of the present invention, an MS is provided that includes at least one processor configured to establish a service flow with a BS, transmit data through the service flow to the BS at an access admission time, receive, from the BS, a first group control signal indicating a data communication interruption for the service flow at an access restriction time, and cease transmission of the data to the BS together with the ceasing of a data transmission from another MS of a group according to the first group control signal.

According to another aspect of the present invention, a BS is provided that includes at least one processor configured to establish service flows with a plurality of MSs subscribed to a time-controlled service, receive, from a server, a command signal including at least one of access interruption indication information and access resumption time information with respect to the service flows of the plurality of MSs, and transmit a first group control signal indicating a data communication interruption for the service flows of the plurality of MSs according to the access interruption indication information.

According to another aspect of the present invention, a server is provided that includes at least one processor configured to determine access control with respect to a time-controlled service for a plurality of MSs, and transmit, to a BS, a command signal including at least one of access interruption indication information and access resumption time information with respect to established service flows of the plurality of MSs based on the access control.

According to another aspect of the present invention, an apparatus of a M2M server is provided for a time-controlled service in an M2M communication system. The apparatus includes a control unit for registering the time-controlled service for an M2M SS, and setting access control with respect to the time-controlled service. The apparatus also includes an interface unit for transmitting an access interruption message to an M2M BS, before an access restriction time period.

BRIEF DESCRIPTION OF THE DRAWINGS

The above and other aspects, objects, features and advantages of the present invention will become more apparent from the following detailed description when taken in conjunction with the accompanying drawings in which.

DETAILED DESCRIPTION OF EMBODIMENTS OF THE PRESENT INVENTION

Various embodiments of the present invention are described in detail with reference to the accompanying drawings. The same or similar components may be designated by the same or similar reference numerals throughout the drawings. Detailed description of constructions or processes known in the art may are omitted to avoid obscuring the subject matter of the present invention.

Embodiments of the present invention provide a scheme for supporting a subscriber station having subscribed to a time-controlled service (i.e., a service allowing data communication only for a predetermined period of time) in a Machine-To-Machine (M2M) communication system.

Figure 1:
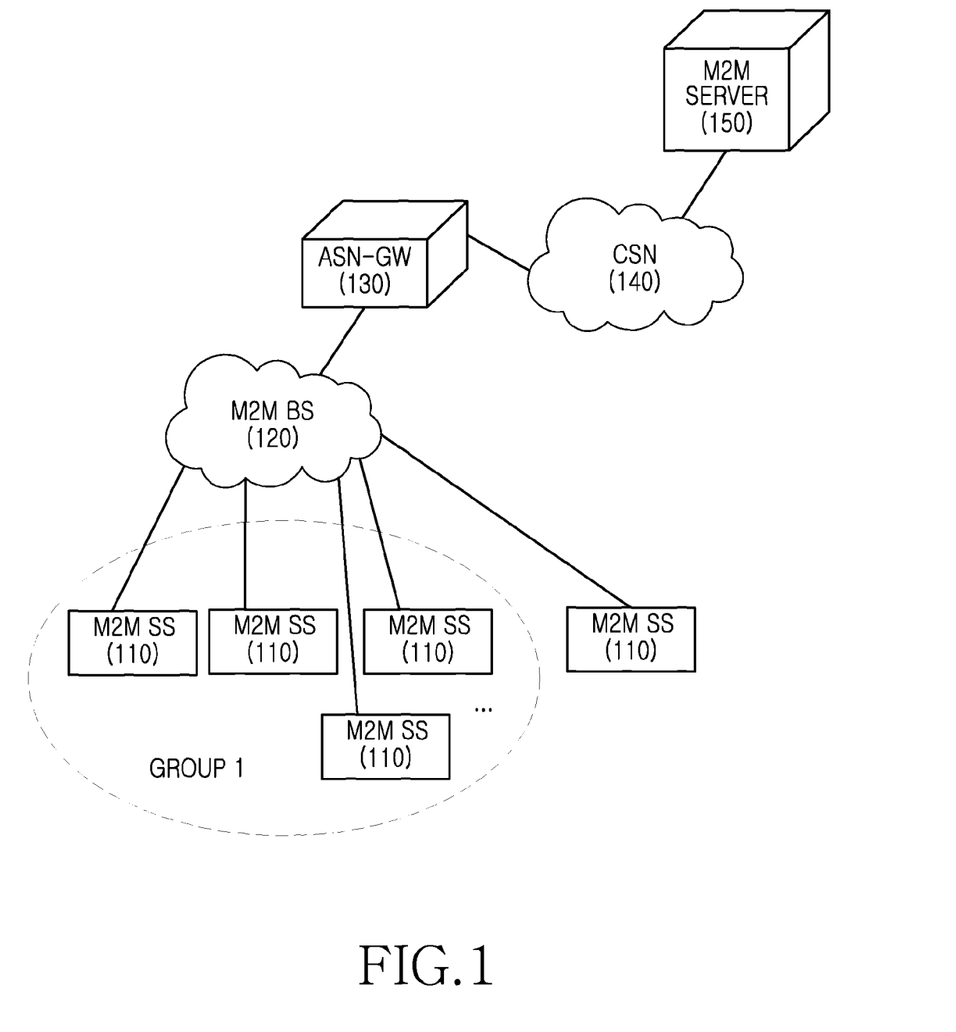
FIG. 1 is a diagram illustrating a schematic configuration of an M2M communication system.

FIG. 1 is a diagram illustrating a schematic configuration of an M2M communication system.

Referring to FIG. 1, the M2M communication system includes an M2M SS 110, an M2M BS 120, an Access Service Network Gateway (ASN-GW) 130, a Connection Service Network (CSN) 140, an M2M server 150.

The M2M SS 110 is a device that mounts an M2M communication application to perform communication without user input. The M2M BS 120 and the ASN-GW 130 provide an access point for communication between the M2M SS 110 and the M2M BS 120. Specifically, the M2M BS 120 controls wireless resources for communication between the M2M SS 110 and the M2M BS 120. The CSN 140 provides a user-end connection service to the M2M SS 110. The M2M BS 120 communicates with one of more M2M SSs 110. The M2M BS 120 mounts an M2M communication application and has an interface accessible by users. In FIG. 1, the M2M BS 120 is illustrated as being separated from the CSN 140. However, in another embodiment, the M2M BS 120 may be included in the CSN 140 according to system operation options.

In the M2M communication system, the wireless interface between the M2M SS 110 and the M2M BS 120 may be based on a conventional communication standard or on the communication standard designed for the M2M communication system. For example, the wireless interface between the M2M SS 110 and the M2M BS 120 may be based on the Institute of Electrical and Electronics Engineers (IEEE) 802.16 communication system standard. The M2M SS 110 may then communicate as a Mobile Station (MS) defined in the IEEE 802.16 communication system. As an example, the following description is made in the context of a wireless interface based on the Orthogonal Frequency Division Multiplexing (OFDM)/Orthogonal Frequency Division Multiple Access (OFDMA) scheme.

Figure 2:
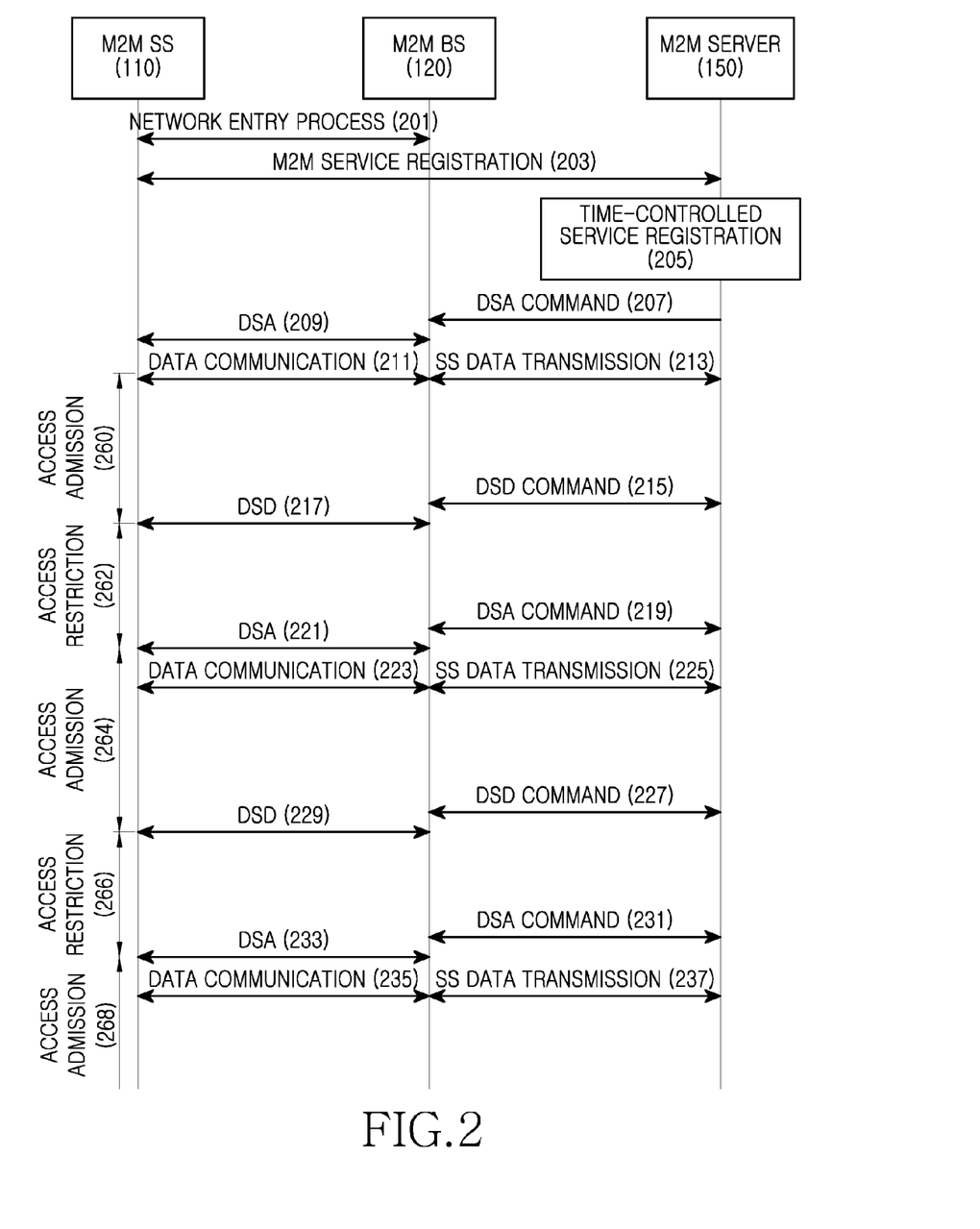
FIG. 2 is a flowchart illustrating a signal flow between a subscriber station, a base station and a server for establishing and releasing a time-controlled service in an M2M communication system.

FIG. 2 is a flowchart illustrating a signal flow between a Subscriber Station (SS), a Base Station (BS) and a server for establishing and releasing a time-controlled service in an M2M communication system.

Referring to FIG. 2, in step 201, the M2M SS 110 performs a network entry process with the M2M BS 120 in order to receive an M2M service. For example, the M2M SS 110 exchanges RaNGing-REQuest/ReSPonse (RNG-REQ/RSP), SS Basic Capability (SBC)-REQ/RSP, Privacy and Key Management (PKM)-REQ/RSP, and REGister (REG)-REQ/RSP messages with the M2M BS 120 in the network entry process.

In step 203, the M2M SS 110 registers an M2M service through the M2M server 150. In step 205, the M2M server 150 registers a time-controlled service through a process according to an embodiment of the present invention. The time-controlled service is a service that communicates data only for a predetermined period of time by using network resources.

In step 207, on the basis of information provided by the M2M server 150, the M2M BS 120 receives a Dynamic Service Addition (DSA) command for the M2M SS 110 from the upper network entity or the M2M server 150. In step 209, the M2M BS 120 and the M2M SS 110 perform a DSA process. A service flow established in the DSA process is used to process data of the time-controlled service registered in step 205. In step 211, the M2M SS 110 and the M2M BS 120 communicate for an access admission time period 260. Data is also exchanged between the M2M BS 120 and the M2M server 150 in step 213.

After expiration of the access admission time period 260 for the service flow established in step 209, a Dynamic Service Deletion (DSD) command is transmitted in step 215 through the upper network entity of the M2M BS 120 according to the information provided by the M2M server 150. In step 217, the M2M BS 120 performs a DSD process with the M2M SS 110. Data communication for the service is then restricted for a service restriction time period 262.

In steps 219 and 221, after expiration of the access restriction time period 262, upon arrival of an access admission time period 264 of a time-controlled service subscribed to by the M2M SS 110, a service flow of the M2M SS 110 is established to communicate for the time-controlled service. In steps 223 and 225, data is communicated between the M2M SS 110, the M2M BS 120 and the M2M server 150 for the access admission time period 264. Upon expiration of the access admission time period 264, an access restriction time period 266 of the time-controlled service is initiated, and a DSD process of the M2M SS 110 is performed in steps 227 and 229. Upon arrival at an access admission time period 268, a service flow of the M2M SS 110 is then established and data is communicated in steps 231 to 237. A process of releasing the service flow is performed for an access restriction time period. In this manner, service flow establishing/releasing processes are repeated according to the access admission time period of the time-controlled service.

Figure 3:
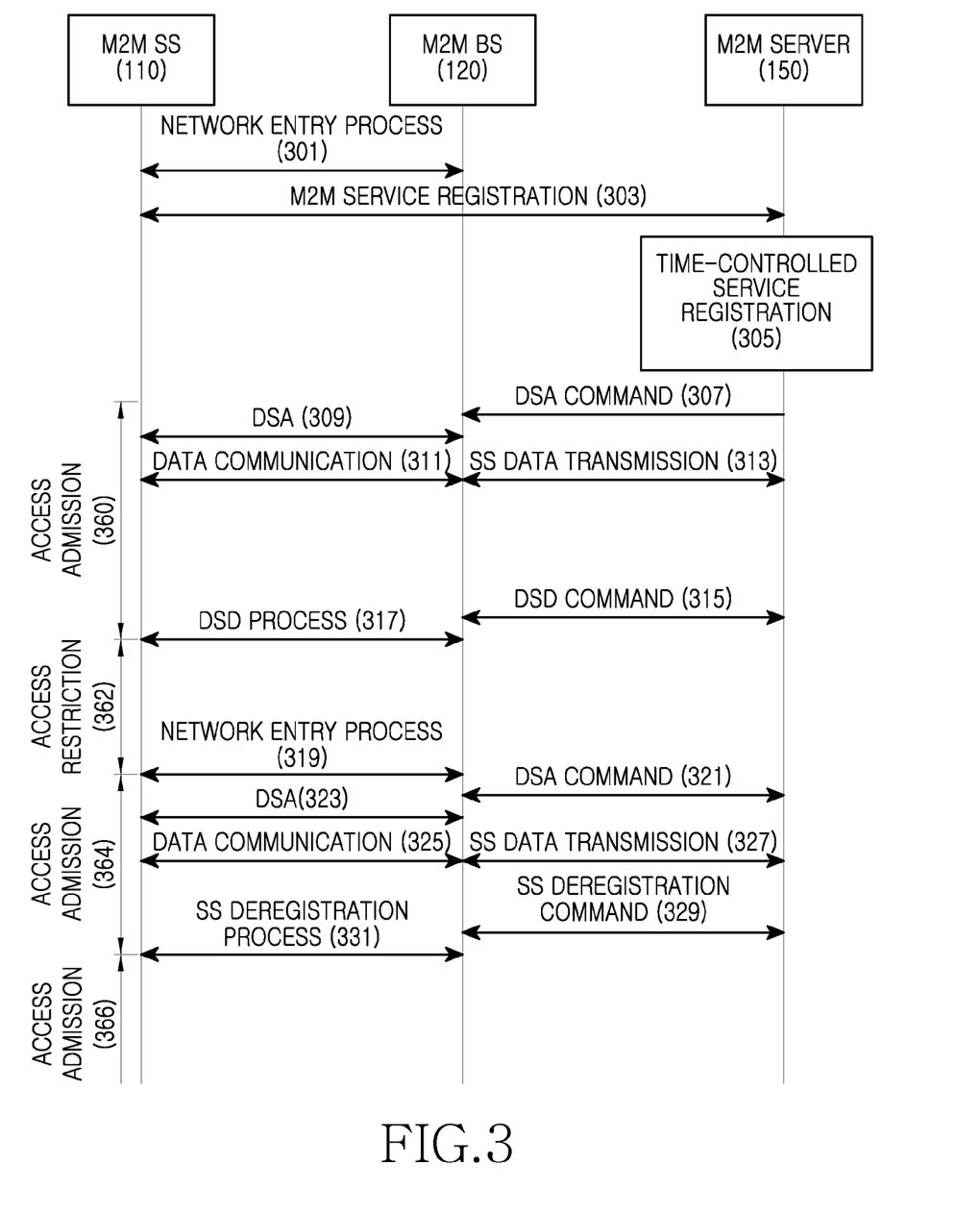
FIG. 3 is a flowchart illustrating a signal flow between a subscriber station, a base station and a server for registering and deregistering a device having subscribed to a time-controlled service in an M2M communication system.

FIG. 3 is a flowchart illustrating a signal flow between a subscriber station, a base station and a server for registering and deregistering a device having subscribed to a time-controlled service in an M2M communication system.

Referring to FIG. 3, in step 301, the M2M SS 110 performs a network entry process with the M2M BS 120 in order to receive an M2M service. In step 303, the M2M SS 110 registers an M2M service through the M2M server 150. In step 305, the M2M server 150 registers a time-controlled service through a process according to an embodiment of the present invention.

In step 307, on the basis of information provided by the M2M server 150, the M2M BS 120 receives a Dynamic Service Addition (DSA) command for the M2M SS 110 from the upper network entity. In step 309, the M2M BS 120 and the M2M SS 110 perform a DSA process. A service flow established in the DSA process is used to process data of the time-controlled service registered in step 305. In step 311, the M2M SS 110 and the M2M BS 120 communicate for an access admission time period 360. The data is also exchanged between the M2M BS 120 and the M2M server 150 in step 313.

After expiration of the access admission time period 360 for the service flow established in step 309, a Dynamic Service Deletion (DSD) command is transmitted in step 315 to the M2M BS 120 according to the information provided by the M2M server 150.

In step 317, the M2M BS 120 and the M2M SS 110 perform an SS deregistration process.

After expiration of the access restriction time period 362, in step 319, the M2M SS 110 performs a network entry process through the M2M BS 120 in order to process data corresponding to a time-controlled service. In step 321, the M2M BS 120 receives a DSA command for the M2M SS 110 from the upper network entity according to the information of the M2M server. In step 323, the M2M BS 120 performs a DSA process with the M2M SS 110. In steps 325 and 327, the M2M SS 110, the M2M BS 120 and the M2M server 150 uses the service flow to communicate for an access admission time period 364. After expiration of the access admission time period 364, in steps 329 and 331, upon arrival at an access restriction time period 366, the M2M BS 120 performs a deregistration process for the M2M SS 110 according to the information of the M2M server 150.

As described with reference to FIGS. 2 and 3, when a time-controlled service is subscribed, it is required to maintain a service flow or M2M SS registration only for the access admission time period.

Thus, a process of establishing a service flow or re-registering an M2M in the network for each access admission time period is performed multiple times. This increases a system overhead due to a service flow addition/deletion process or a network entry/deregistration process.

Hereinafter, a description will be given of a scheme for reducing the overhead of dynamic service addition/deletion and network registration/deregistration processes while supporting an M2M SS having subscribed to a time-controlled service with reference to FIGS. 4 and 5.

Figure 4:
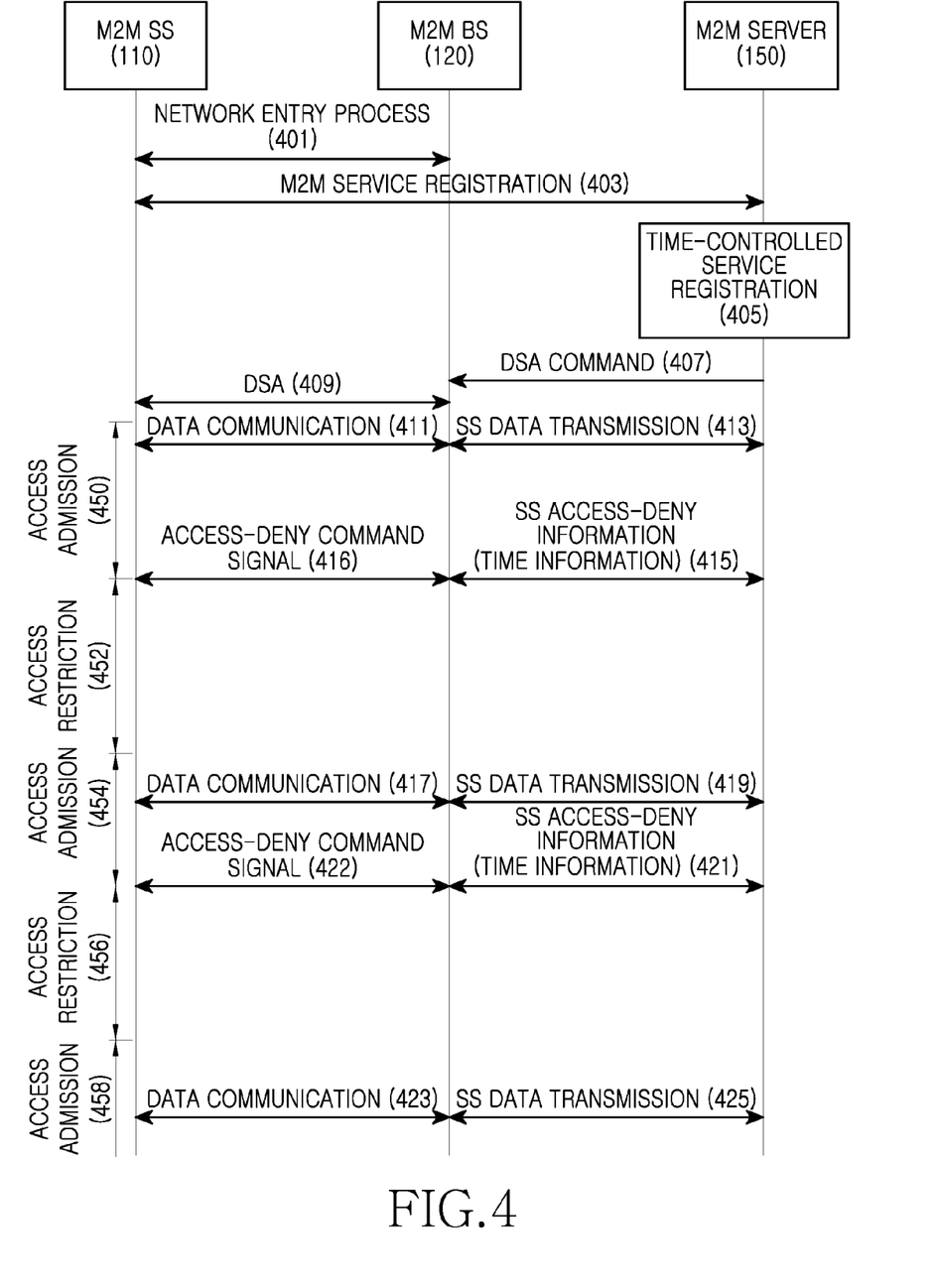
FIG. 4 is a flowchart illustrating a signal flow between a subscriber station, a base station and a server for supporting a time-controlled service in an M2M communication system according to an embodiment of the present invention.

FIG. 4 is a flowchart illustrating a signal flow between a subscriber station, a base station and a server for supporting a time-controlled service in an M2M communication system according to an embodiment of the present invention.

Referring to FIG. 4, in step 401, the M2M SS 110 performs a network entry process with the M2M BS 120 in order to receive an M2M service. In step 403, the M2M SS 110 registers an M2M service through the M2M server 150. In step 405, the M2M server 150 registers a time-controlled service through a process according to an embodiment of the present invention.

In step 407, on the basis of information provided by the M2M server 150, the M2M BS 120 receives a Dynamic Service Addition (DSA) command for the M2M SS 110 from the upper network entity. In step 409, the M2M BS 120 and the M2M SS 110 perform a DSA process. A service flow established in the DSA process is used to process data of the time-controlled service registered in step 405. In step 411, the M2M SS 110 and the M2M BS 120 communicate for an access admission time period 450. The data is exchanged between the M2M BS 120 and the M2M server 150 in step 413. Upon arrival at an access restriction time period 452 for the service flow, in step 415, an access-deny command signal for the service flow is transmitted from the upper network entity of the M2M BS 120 to the M2M BS 120 according to information provided by the M2M server 150. The access-deny command signal transmitted in step 415 may include access interruption indication information and access resumption time information with respect to the service flow. On the basis of the access-deny command signal, the M2M BS 120 does not allow data communication in the service flow. At this point, the service flow established in step 409 is maintained.

In step 416, according to the access interruption indication information, the M2M BS 120 transmits a data communication interruption indication signal for the service flow to the M2M SS 110. The data communication interruption indication signal of step 416 is transmitted by being piggybacked on a Media Access Control (MAC) control message, a signaling header, or downlink data transmitted from the M2M BS 120 to the M2M SS 110.

In step 417, upon arrival at an access admission time period 454 according to the access resumption time information included in the access-deny command signal, the M2M BS 120 resumes data communication with the M2M SS 110 without performing a DSA process (i.e., by using the service flow established in step 409).

In step 419, the M2M BS 120 transmits data of the M2M SS 110 to the M2M server 150.

Upon arrival at an access restriction time period 456 for the service flow, in step 421, an access-deny command signal for the service flow is transmitted from the upper network entity of the M2M BS 120 to the M2M BS 120 according to information provided by the M2M server 150. In step 422, the M2M BS 120 transmits a data communication interruption indication signal for the service flow to the M2M SS 110.

Upon resumption of an access admission time period 458, the M2M BS 120 resumes data communication with the M2M SS 110 in step 423.

Data of the M2M SS 110 are transmitted to the M2M server 150 (step 425). For the access restriction time period (452, 456), a control signal or data corresponding to a service flow corresponding to the time-controlled service is not processed by the M2M BS 120.

In one embodiment of FIG. 4, access admission or restriction indication signals for a service flow corresponding to the time-controlled service are exchanged between the M2M BS 120 and the M2M SS 110. In another embodiment of FIG. 4, the access admission time information and the access restriction time information may be included through a DSA message exchanged between the M2M BS 120 and M2M SS 110 during the DSA process of step 409. The M2M SS 110 and the M2M BS 120 perform data communication for the time-controlled service on the basis of the access admission time information and the access restriction time information.

Figure 5:
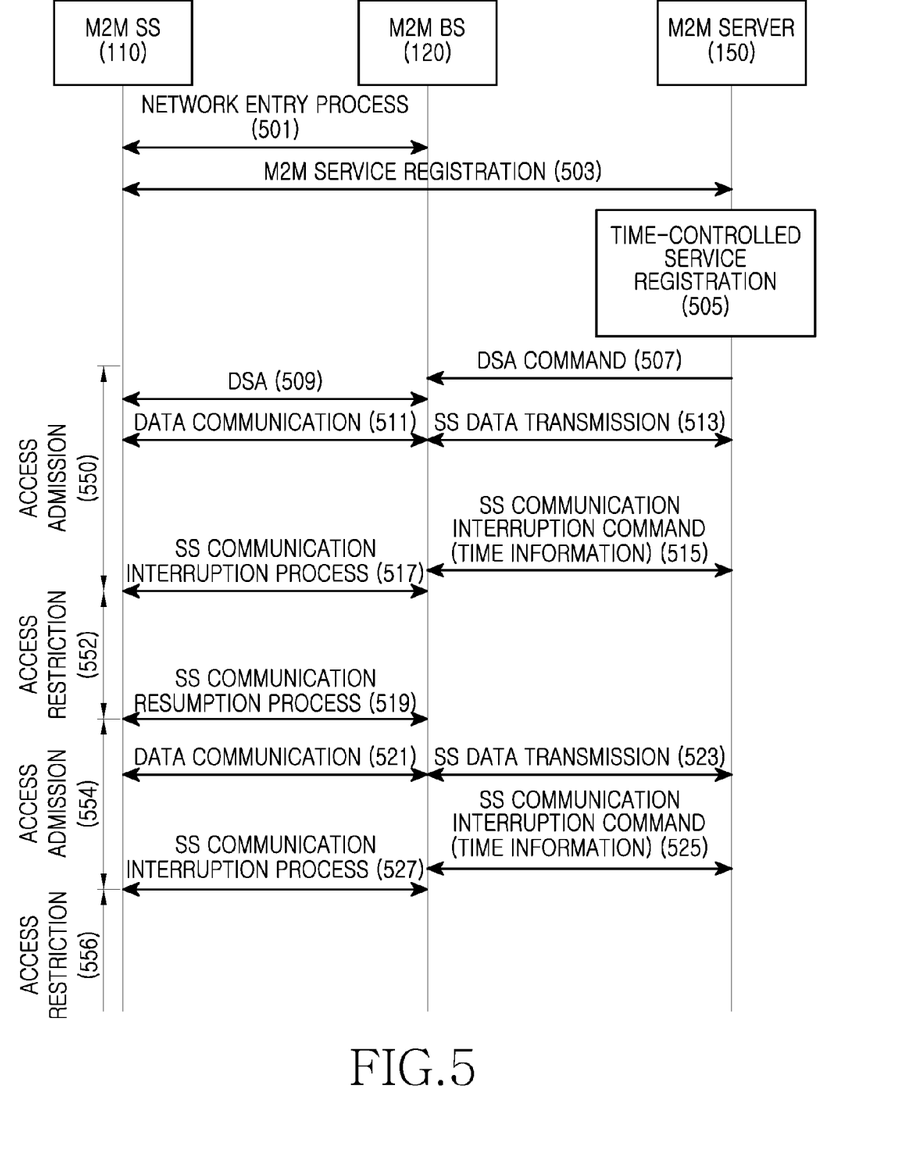
FIG. 5 is a flowchart illustrating a signal flow between a subscriber station, a base station and a server for supporting a time-controlled service in an M2M communication system according to an embodiment of the present invention.

FIG. 5 is a flowchart illustrating a signal flow between a subscriber station, a base station and a server for supporting a time-controlled service in an M2M communication system according to an embodiment of the present invention.

Referring to FIG. 5, in step 501, the M2M SS 110 performs a network entry process with the M2M BS 120 in order to receive an M2M service. In step 503, the M2M SS 110 registers an M2M service through the M2M server 150. In step 505, the M2M server 150 registers a time-controlled service through a process according to an embodiment of the present invention.

In step 507, on the basis of information provided by the M2M server 150, the M2M BS 120 then receives a Dynamic Service Addition (DSA) command for the M2M SS 110 from the upper network entity.

In step 509, the M2M BS 120 and the M2M SS 110 perform a DSA process. A service flow established in the DSA process is used to process data of the time-controlled service registered in step 505. In step 511, the M2M SS 110 and the M2M BS 120 communicate for an access admission time period 550. The data is exchanged between the M2M BS 120 and the M2M server 150 in step 513. Upon arrival at an access restriction time period 552 for the service flow, in step 515, an access-deny command signal for the service flow is transmitted from the upper network entity of the M2M BS 120 to the M2M BS 120 according to information provided by the M2M server 150. The access-deny command signal transmitted in step 515 may include access interruption indication information and access resumption time information with respect to the service flow. In step 517, according to the access-deny command signal, the M2M BS 120 transmits a data communication interruption indication signal for the service flow to the M2M SS 110. The data communication interruption indication signal of step 517 may be used by setting a specific action code of a control signal used in an SS deregistration process. For example, the data communication interruption indication signal may correspond to a control signal that includes an action code allowing the communication of only a control signal with the M2M BS 120 or an action code allowing the monitoring of only a downlink signal of the M2M BS 120. As another example, a new action code (e.g., an action code not allowing data communication corresponding to a specific service flow with the M2M BS 120) may be established to a control signal used in the SS deregistration process. The control signal may include the new action code and the identifier of a service flow for stopping the data communication.

Thereafter, upon arrival at an access admission time period 554, in step 519, the M2M BS 120 and the M2M SS 110 perform a process of resuming data communication for a service flow corresponding to the time-controlled service. In step 519, the M2M BS 120 may set and use a specific action code of a control signal used in the SS deregistration process. For example, the specific action code may correspond to a control signal that includes an action code indicating the possibility of performing normal data communication with the M2M BS 120. As another example, a new action code (i.e., an action code for indicating the resumption of data communication corresponding to a specific service flow with the M2M BS 120) may be established to a control signal used in the SS deregistration process. Herein, the control signal may include the new action code and the identifier of a service flow for resuming the data communication.

When data communication for the service flow is resumed, in step 521, the M2M SS 110 and the M2M BS 120 perform data communication corresponding to the service flow for the access admission time period 554, and, in step 523, the M2M BS 120 exchanges data of the M2M SS 110 with the M2M server 150. Upon arrival at an access restriction time period 556, in steps 525 and 527, the M2M SS 110 and the M2M BS 120 perform the operations of steps 515 and 517 in order to interrupt the data communication for the service flow.

Figure 6:
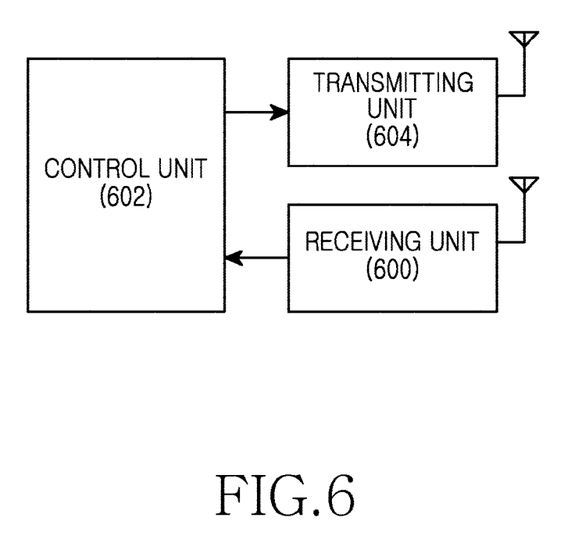
FIG. 6 is a block diagram illustrating an apparatus for supporting a time-controlled service in an M2M communication system according to an embodiment of the present invention.

FIG. 6 is a block diagram of an apparatus (an M2M SS or an M2M BS) for supporting a time-controlled service in an M2M communication system according to an embodiment of the present invention.

Referring to FIG. 6, the apparatus may include a receiving unit 600, a control unit 602, and a transmitting unit 604.

If the apparatus is an M2M SS, the receiving unit 600 receives signals from the M2M BS on the basis of the OFDM/OFDMA scheme. For example, in a network entry process and an M2M service registration process, the receiving unit 600 receives messages exchanged with the M2M BS and provides the same to the control unit 602. Also, the receiving unit 600 receives a DSA/DSD message and provides the message to the control unit 602.

The transmitting unit 604 receives messages for a network entry process and an M2M service registration process from the control unit 602, and transmits the messages to the M2M BS on the basis of the OFDM/OFDMA scheme.

To perform a network entry process and an M2M service registration process, the control unit 602 analyzes a relevant control message received from the receiving unit 600, generates a relevant control message, and outputs the message to the transmitting unit 604. In addition, the control unit 602 controls a time-controlled service according to the present invention. For example, in the first embodiment, for the time-controlled service, the control unit 602 adds a service flow and exchanges data with the M2M BS upon arrival at an access admission time period and deletes only the established service flow upon arrival at an access restriction time period. That is, in the first embodiment, a DSA/DSD process is performed multiple times.

In the second embodiment, for the time-controlled service, the control unit 602 adds a service flow and exchanges data with the M2M BS upon arrival at an access admission time period and performs a deregistration process upon arrival at an access restriction time period. Upon arrival at an access admission time period after expiration of an access restriction time period, the control unit 602 performs both a network entry process and a DSA process.

In the third embodiment, for the time-controlled service, the control unit 602 adds a service flow and exchanges data with the M2M BS upon arrival at an access admission time period and receives an access-deny command signal from the M2M BS and interrupts the access upon arrival at an access restriction time period. However, a previously-established service flow is maintained at this point. Upon arrival at an access admission time period after expiration of an access restriction time period, the control unit 602 uses the previously-established service flow to exchange data with the M2M BS.

In a fourth embodiment, for the time-controlled service, the control unit 602 adds a service flow and exchanges data with the M2M BS upon arrival at an access admission time period and receives an access-deny command signal from the M2M BS and interrupts the access upon arrival at an access restriction time period. However, a previously-established service flow is maintained at this point. Upon arrival at an access admission time period after expiration of an access restriction time period, the control unit 602 receives an access admission command for a previously-established service flow from the M2M BS and uses the previously-established service flow to exchange data with the M2M BS.

If the apparatus is an M2M BS, the receiving unit 600 receives signals from the M2M SS on the basis of the OFDM/OFDMA scheme. For example, in a network entry process and an M2M service registration process, the receiving unit 600 receives messages exchanged with the M2M SS and provides the same to the control unit 602. Also, the receiving unit 600 receives a DSA/DSD message and provides the same to the control unit 602.

The transmitting unit 604 receives messages for a network entry process and an M2M service registration process from the control unit 602, and transmits the messages to the M2M SS on the basis of the OFDM/OFDMA scheme.

In order to perform a network entry process and an M2M service registration process, the control unit 602 analyzes a relevant control message received from the receiving unit 600, generates a relevant control message, and outputs the message to the transmitting unit 604. In addition, the control unit 602 controls a time-controlled service according to the present invention. For example, in the first embodiment, for the time-controlled service, the control unit 602 adds a service flow and exchanges data with the M2M SS upon arrival at an access admission time period and deletes only the established service flow upon arrival at an access restriction time period. That is, in the first embodiment, a DSA/DSD process is performed multiple times.

In the second embodiment, for the time-controlled service, the control unit 602 adds a service flow and exchanges data with the M2M SS upon arrival at an access admission time period and performs a deregistration process upon arrival at an access restriction time period. Upon arrival at an access admission time period after expiration of an access restriction time period, the control unit 602 performs both a network entry process and a DSA process.

In the third embodiment, for the time-controlled service, the control unit 602 adds a service flow and exchanges data with the M2M SS upon arrival at an access admission time period and receives an access-deny command signal from the M2M server and interrupts the access upon arrival at an access restriction time period. However, a previously-established service flow is maintained at this point. Upon arrival at an access admission time period after expiration of an access restriction time period, the control unit 602 uses the previously-established service flow to exchange data with the M2M SS.

In the fourth embodiment, for the time-controlled service, the control unit 602 adds a service flow and exchanges data with the M2M SS upon arrival at an access admission time period and receives an access-deny command signal from the M2M server and interrupts the access upon arrival at an access restriction time period. However, a previously-established service flow is maintained at this point. Upon arrival at an access admission time period after expiration of an access restriction time period, the control unit 602 transmits an access admission command for a previously-established service flow to the M2M SS and uses the previously-established service flow to exchange data with the M2M SS.

Figure 7:
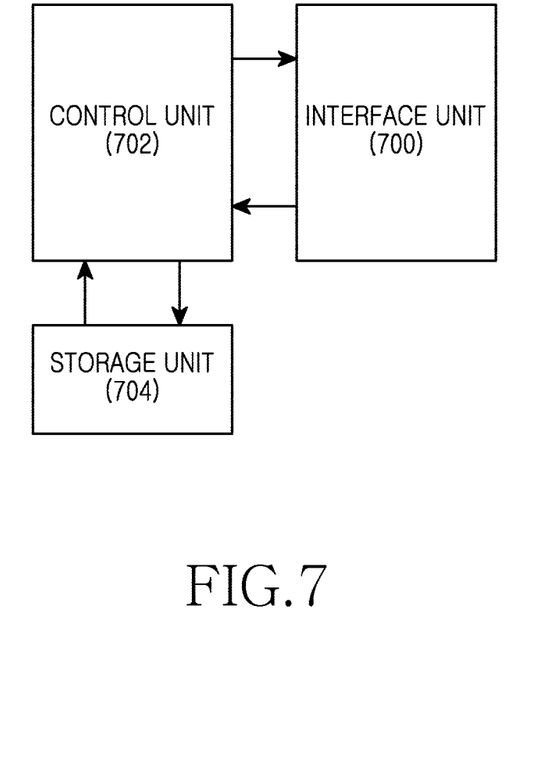
FIG. 7 is a block diagram illustrating an M2M server for supporting a time-controlled service in an M2M communication system according to an embodiment of the present invention.

FIG. 7 is a block diagram of an M2M server for supporting a time-controlled service in an M2M communication system according to an embodiment of the present invention.

Referring to FIG. 7, the M2M server may include an interface unit 700, a control unit 702, and a storage unit 704.

The interface unit 700 receives an M2M service registration request of a Subscriber Station (SS) through an M2M Base Station (BS), provides the M2M service registration request to the control unit 702, and transmits a Dynamic Service Addition (DSA) command message, a Dynamic Service Deletion (DSD) command message, or access-deny information to the M2M BS on the basis of a time-controlled service.

The control unit 702 controls an overall operation of the M2M server. In addition, the control unit 702 controls a time-controlled service according to the present invention. For example, when receiving an M2M service registration request from a subscriber station, the control unit 702 determines an access admission time period and an access restriction time period for the M2M service and stores the access admission time period and the access restriction time period in the storage unit 704.

Moreover, on the basis of the access admission time period and the access restriction time period for the M2M service stored in the storage unit 704, the control unit 702 generates a DSA command message, a DSD command message, or access-deny information and provides the message or information to the interface unit 700.

The storage unit 704 stores data related to a time-controlled service of the relevant M2M SSs (e.g., data transmitted by the M2M SS, and access admission time information and access restriction time information for an M2M service).

Figure 8:
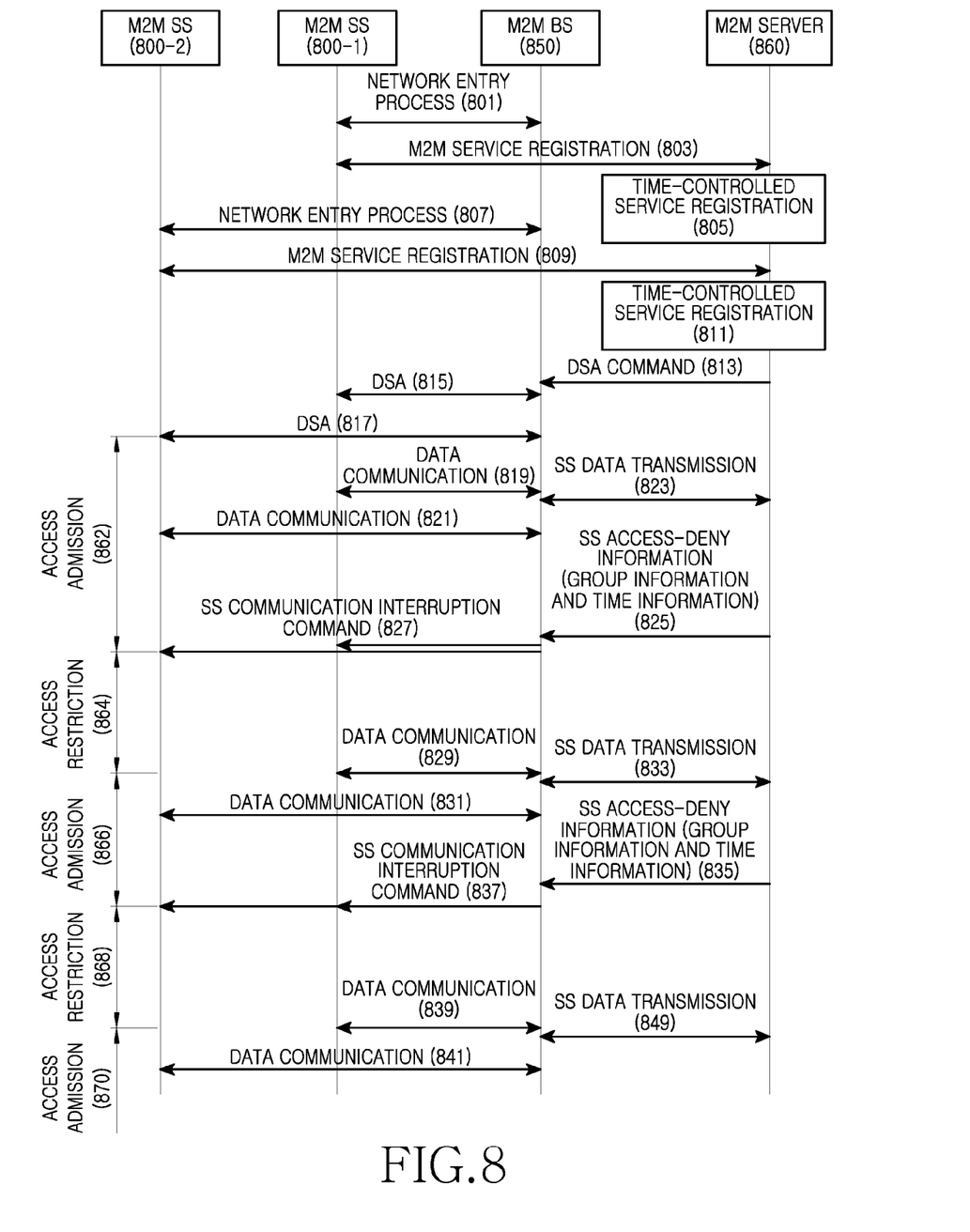
FIG. 8 is a flowchart illustrating a signal flow between a subscriber station, a base station and a server for supporting a time-controlled service in an M2M communication system according to an embodiment of the present invention.

FIG. 8 is a flowchart illustrating a signal flow between a subscriber station, a base station and a server for supporting a time-controlled service in an M2M communication system according to an embodiment of the present invention.

Referring to FIG. 8, in step 801, an M2M SS 800-1 performs a network entry process with an M2M BS 850 in order to receive an M2M service. In step 803, the M2M SS 800-1 registers an M2M service through an M2M server 860. In step 805, the M2M server 860 registers a time-controlled service through a process according to an embodiment of the present invention. Moreover, in steps 807 to 811, an M2M SS 800-2 performs the same process as the steps 801 to 805 of the M2M SS 800-1.

In step 813, on the basis of information provided by the M2M server 860, the M2M BS 850 receives a Dynamic Service Addition (DSA) command for the M2M SSs 800-1 and 800-2 from the upper network entity. In steps 815 and 817, the M2M BS 850 and the M2M SSs 800-1 and 800-2 perform a DSA process. A service flow established in the DSA process is used to process data of a time-controlled service registered in steps 805 and 811. In steps 819 and 821, the M2M SSs 800-1 and 800-2 and the M2M BS 850 communicate for an access admission time period 862. The data is exchanged between the M2M BS 850 and the M2M server 860 in step 823. In step 825, upon arrival at an access restriction time period 864 for the service flow, an access-deny command signal for the service flow is transmitted from the upper network entity of the M2M BS 850 to the M2M BS 850 according to information provided by the M2M server 860. The access-deny command signal transmitted in step 825 may include access interruption indication information and access resumption time information regarding the service flow. On the basis of the access-deny command signal, the M2M BS 850 does not admit data communication for the service flow.

In step 827, according to the access interruption indication information, the M2M BS 850 transmits a data communication interruption indication signal for the service flow to the M2M SSs 800-1 and 800-2. The data communication interruption indication signal of step 827 is transmitted in the form of a group signaling header or a group MAC control message used to group and manage a plurality of M2M SSs having subscribed to the same time-controlled service. The group signaling header or the group MAC control message transmitted in step 827 is identified by a group identifier known to the M2M SSs 800-1 and 800-2.

Thereafter, in steps 829 and 831, upon arrival at an access admission time period 866 according to the access resumption time information included in the access-deny command signal, the M2M BS 850 resumes data communication with the M2M SSs 800-1 and 800-2 without performing a DSA process (e.g., by using the service flow established in steps 815 and 817).

In step 833, the M2M BS 850 transmits data of the M2M SSs 800-1 and 800-2 to the M2M server 860.

In step 835, upon arrival at an access restriction time period 868 for the service flow, an access-deny command signal for the service flow is transmitted from the upper network entity of the M2M BS 850 to the M2M BS 850 according to information provided by the M2M server 860. In step 837, the M2M BS 850 transmits a data communication interruption indication signal for the service flow to the M2M SSs 800-1 and 800-2. The data communication interruption indication signal of step 837 is a group control signal identical to the signal of step 827.

After entry into an access admission time period 870, the M2M BS 850 resumes data communication with the M2M SSs 800-1 and 800-2 in steps 839 and 841.

Data of the M2M SSs 800-1 and 800-2 are transmitted to the M2M server 860 in step 843. For the access restriction time period in steps 864, 868, a control signal or data corresponding to a service flow corresponding to the time-controlled service is not processed by the M2M BS 850.

Figure 9:
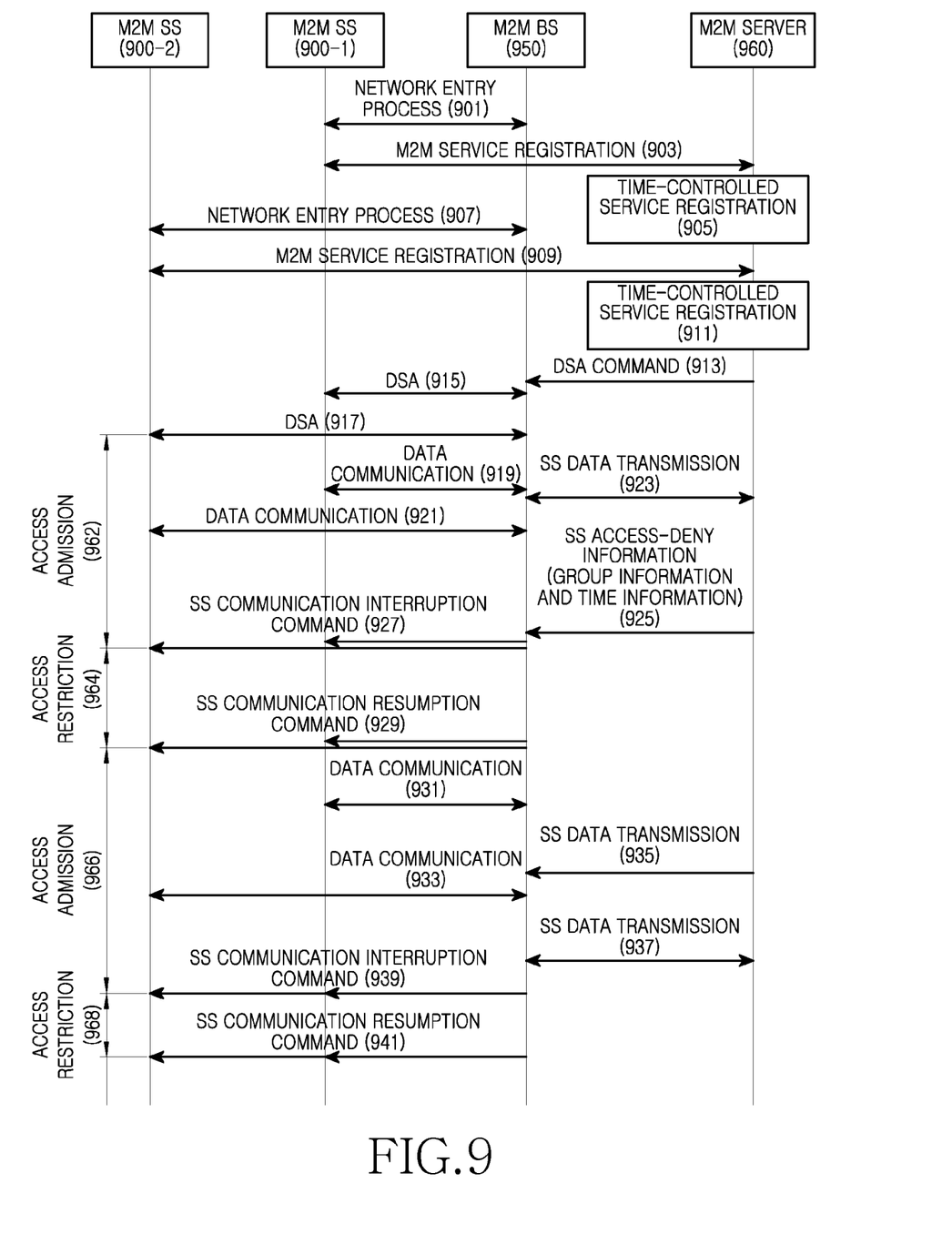
FIG. 9 is a flowchart illustrating a signal flow between a subscriber station, a base station and a server for supporting a time-controlled service in an M2M communication system according to an embodiment of the present invention.

FIG. 9 is a flowchart illustrating a signal flow between a subscriber station, a base station and a server for supporting a time-controlled service in an M2M communication system according to an embodiment of the present invention.

Referring to FIG. 9, in step 901, an M2M SS 900-1 performs a network entry process with an M2M BS 950 in order to receive an M2M service. In step 903, the M2M SS 900-1 registers an M2M service through an M2M server 960. In step 905, the M2M server 960 registers a time-controlled service through a process according to an embodiment of the present invention. Furthermore, in steps 907 to 911, an M2M SS 900-2 performs the same process as the steps 901 to 905 of the M2M SS 900-1.

In step 913, on the basis of information provided by the M2M server 960, the M2M BS 950 receives a Dynamic Service Addition (DSA) command for the M2M SSs 900-1 and 900-2 from the upper network entity.

In steps 915 and 917, the M2M BS 950 and the M2M SSs 900-1 and 900-2 perform a DSA process. A service flow established in the DSA process is used to process data of the time-controlled service registered in steps 905 and 9111. In steps 919 and 921, the M2M SSs 900-1 and 900-2 and the M2M BS 950 communicate for an access admission time period 962. In step 923, the data is exchanged between the M2M BS 950 and the M2M server 960. In step 925, upon arrival at an access restriction time period 964 for the service flow, an access-deny command signal for the service flow is transmitted from the upper network entity of the M2M BS 950 to the M2M BS 950 according to information provided by the M2M server 960. In step 925, the access-deny command signal transmitted may include access interruption indication information and access resumption time information with respect to the service flow. In step 927, according to the access-deny command signal, the M2M BS 950 transmits a data communication interruption indication signal for the service flow to the M2M SSs 900-1 and 900-2.

The data communication interruption indication signal of step 927 may be used by setting a specific action code of a control signal used in an SS deregistration process. For example, the data communication interruption indication signal may correspond to a control signal that includes an action code allowing the communication of only a control signal with the M2M BS 950 or an action code allowing the monitoring of only a downlink signal of the M2M BS 950. As another example, a new action code (e.g., an action code which does not allow data communication corresponding to a specific service flow with the M2M BS 950) may be established to a control signal used in the SS deregistration process. The control signal may include the new action code and the identifier of a service flow for stopping the data communication. The control signal of step 927 is transmitted by a group identifier used to group and manage a plurality of M2M SSs having subscribed to the same time-controlled service. If the control signal also includes an identifier of the service flow, the identifier corresponds to a group service flow identifier for identifying the time-controlled service.

Upon arrival at an access admission time period 966, in step 929, the M2M BS 950 and the M2M SSs 900-1 and 900-2 then perform a process of resuming data communication for a service flow corresponding to the time-controlled service. In step 929, the M2M BS 950 may set and use a specific action code of a control signal used in an SS deregistration process. For example, the specific action code may correspond to a control signal that includes an action code for indicating the possibility of performing normal data communication with the M2M BS 950. In another example, a new action code (e.g., an action code for notifying the resumption of data communication corresponding to a specific service flow with the M2M BS 950) may be established to a control signal used in the SS deregistration process. The control signal may include the new action code and the identifier of a service flow for resuming the data communication. The control signal of step 929 is transmitted by a group identifier used to group and manage a plurality of M2M SSs having subscribed to the same time-controlled service. If the control signal also includes an identifier of the service flow, the identifier corresponds to a group service flow identifier for identifying the time-controlled service.

When data communication for the service flow resumes, in steps 931 and 933, the M2M SSs 900-1 and 900-2 and the M2M BS 950 perform data communication corresponding to the service flow for the access admission time period 966, and, in step 935, the M2M BS 950 exchanges data of the M2M SSs 900-1 and 900-2 with the M2M server 960. Upon arrival at an access restriction time period 968, the M2M SSs 900-1 and 900-2 and the M2M BS 950 perform the operations of steps 927 and 929 in order to interrupt the data communication for the service flow (steps 939 and 941).

As described above, when the M2M communication system supports data communication of a device having subscribed to a time-controlled service, embodiments of the present invention perform a simplified access restriction process instead of continuously performing a DSA/DSD process or an SS registration/deregistration process according to the access admission/restriction time period, thus making it possible to support data communication of a time-controlled service without causing a system overhead.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for operating a Mobile Station (MS), the method comprising:
    establishing a service flow with a Base Station (BS);
    transmitting data through the service flow to the BS at an access admission time;
    receiving, from the BS, a first group control signal indicating a data communication interruption for the service flow at an access restriction time; and
    ceasing transmission of the data to the BS together with the ceasing of a data transmission from another MS of a group according to the first group control signal.

2. The method of claim 1, wherein transmitting the data through the service flow comprises:
    identifying the access admission time included in the first group control signal; and
    transmitting the data through the service flow upon arrival of the access admission time.

3. The method of claim 1, wherein transmitting the data through the service flow comprises:
    receiving a second group control signal including at least one of information indicating a resumption of data communication of the service flow and a group service flow identifier for identifying a time-controlled service; and
    transmitting the data through the service flow upon arrival of the access admission time according to the second group control signal.

4. The method of claim 1, wherein the first group control signal is transmitted as a group signaling header or a group Media Access Control (MAC) control message.

5. The method of claim 1, wherein the MS and the other MS are subscribed to a same time-controlled service.

6. A method for operating a Base Station (BS), the method comprising:
    establishing service flows with a plurality of Mobile Stations (MSs) subscribed to a time-controlled service;
    receiving, from a server, a command signal including at least one of access interruption indication information and access resumption time information with respect to the established service flows of the plurality of MSs; and
    transmitting a first group control signal indicating a data communication interruption for the service flows of the plurality of MSs according to the access interruption indication information.

7. The method of claim 6, further comprising:
    transmitting an access admission time based on the access resumption time information to the plurality of MSs through the first group control.

8. The method of claim 6, further comprising:
    transmitting a second group control signal including at least one of information indicating a resumption of data communication of the service flows and a group service flow identifier for identifying the time-controlled service, to the plurality of MSs.

9. A method for operating a server, the method comprising:
    determining access control with respect to a time-controlled service for a plurality of Mobile Station (MSs); and
    transmitting, to a Base Station (BS), a command signal including at least one of access interruption indication information and access resumption time information with respect to established service flows of the plurality of MSs based on the access control.

10. The method of claim 9, wherein the plurality of MSs are subscribed to a same time-controlled service as a group.

11. A Mobile Station (MS) comprising:
    at least one processor configured to:
        establish a service flow with a Base Station (BS),
        transmit data through the service flow to the BS at an access admission time,
        receive, from the BS, a first group control signal indicating a data communication interruption for the service flow at an access restriction time, and
        cease transmission of the data to the BS together with the ceasing of a data transmission from another MS of a group according to the first group control signal.

12. The MS of claim 11, wherein the processor is further configured to identify the access admission time included in the first group control signal, and transmit the data through the service flow upon arrival of the access admission time.

13. The MS of claim 11, wherein the processor is further configured to receive a second group control signal including at least one of information indicating a resumption of data communication of the service flow and a group service flow identifier for identifying a time-controlled service, and transmit the data through the service flow upon arrival of the access admission time according to the second group control signal.

14. The MS of claim 11, wherein the first group control signal is transmitted as a group signaling header or a group Media Access Control (MAC) control message.

15. The MS of claim 11, wherein the MS and the other MS are subscribed to a same time-controlled service.

16. A Base Station (BS) comprising:
    at least one processor configured to:
        establish service flows with a plurality of Mobile Stations (MSs) subscribed to a time-controlled service,
        receive, from a server, a command signal including at least one of access interruption indication information and access resumption time information with respect to the service flows of the plurality of MSs, and
        transmit a first group control signal indicating a data communication interruption for the service flows of the plurality of MSs according to the access interruption indication information.

17. The BS of claim 16, wherein the processor is further configured to transmit an access admission time based on the access resumption time information to the plurality of MSs through the first group control.

18. The BS of claim 16, wherein the processor is further configured to transmit a second group control signal including at least one of information indicating a resumption of data communication of the service flows and a group service flow identifier for identifying the time-controlled service, to the plurality of MSs.

19. A server comprising:
    at least one processor configured to:
        determine access control with respect to a time-controlled service for a plurality of Mobile Station (MSs), and transmit, to a Base Station (BS), a command signal including at least one of access interruption indication information and access resumption time information with respect to established service flows of the plurality of MSs based on the access control.

20. The server of claim 19, wherein the plurality of MSs are subscribed to a same time-controlled service as a group.

* * * * *